(12) United States Patent
Pastuschka et al.

(10) Patent No.: US 9,528,620 B2
(45) Date of Patent: Dec. 27, 2016

(54) PRESSURE REDUCING VALVE

(71) Applicant: Robert Bosch GmbH, Stuttgart (DE)

(72) Inventors: Juergen Pastuschka, Karlstadt (DE); Liebhart Zaiser, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/662,424

(22) Filed: Mar. 19, 2015

(65) Prior Publication Data

US 2015/0267826 A1 Sep. 24, 2015

(30) Foreign Application Priority Data

Mar. 19, 2014 (DE) .......................... 10 2014 205 041

(51) Int. Cl.
*F16K 17/10* (2006.01)
*G05D 16/20* (2006.01)

(52) U.S. Cl.
CPC .......... *F16K 17/10* (2013.01); *G05D 16/2093* (2013.01); *Y10T 137/7762* (2015.04); *Y10T 137/86614* (2015.04); *Y10T 137/87209* (2015.04)

(58) Field of Classification Search
CPC ................. Y10T 137/7762; Y10T 137/86614; Y10T 137/87209; F16K 17/10; G05D 16/2093
USPC .......... 137/625.64, 596.16; 251/30.01–30.05
See application file for complete search history.

(56) References Cited

U.S. PATENT DOCUMENTS

| | | | | |
|---|---|---|---|---|
| 2,940,475 A | * | 6/1960 | Hicks | F15B 13/043 137/596.16 |
| 2,993,511 A | * | 7/1961 | Johnson | F15B 13/0431 137/625.64 |
| 3,727,877 A | * | 4/1973 | Beguiristain | A61C 17/04 251/30.05 |
| 3,875,849 A | * | 4/1975 | Patel | F15B 9/08 137/625.64 |

(Continued)

FOREIGN PATENT DOCUMENTS

| | | |
|---|---|---|
| DE | 35 37 336 A1 | 4/1987 |
| DE | 37 39 824 C2 | 6/1989 |

(Continued)

OTHER PUBLICATIONS

German Search Report corresponding to DE 10 2014 205 041.3, dated Dec. 3, 2014 (German language document) (8 pages).

(Continued)

*Primary Examiner* — William McCalister
(74) *Attorney, Agent, or Firm* — Maginot, Moore & Beck LLP

(57) ABSTRACT

A pressure reducing valve includes main and pilot valves. The pilot valve is configured to regulate a pilot pressure, and includes pilot, drain, and first control-oil ports, a first opening cross section between the first control-oil and pilot ports, a second opening cross section between the pilot and drain ports; and a pilot part. The pilot part is configured to keep the pilot pressure at least substantially constant and control the first and second opening cross sections to be open during a pressure control operation. The main valve is fluidically connected to the pilot port and includes a second control-oil port, an outlet port, a third opening cross section between the second control-oil port and the outlet port, and a control part configured to control the third opening cross section based on the pilot pressure.

14 Claims, 2 Drawing Sheets

(56) References Cited

U.S. PATENT DOCUMENTS

| | | | | |
|---|---|---|---|---|
| 4,201,116 A | * | 5/1980 | Martin | F15B 13/0402 |
| | | | | 137/625.64 |
| 4,340,087 A | * | 7/1982 | El-Ibiary | F15B 13/0433 |
| | | | | 137/596.1 |
| 4,560,047 A | * | 12/1985 | McCarthy | F16D 48/066 |
| | | | | 137/596.16 |
| 4,785,849 A | * | 11/1988 | Masuda | G05D 16/2093 |
| | | | | 137/625.6 |
| 5,165,448 A | * | 11/1992 | Handte | F15B 13/043 |
| | | | | 137/625.62 |
| 5,261,455 A | * | 11/1993 | Takahashi | B60G 17/0152 |
| | | | | 137/625.64 |
| 6,192,937 B1 | * | 2/2001 | Fagerlie | F15B 13/0402 |
| | | | | 137/625.63 |
| 2001/0025662 A1 | * | 10/2001 | Kawamura | F16H 61/0251 |
| | | | | 137/625.65 |

FOREIGN PATENT DOCUMENTS

| | | |
|---|---|---|
| DE | 36 88 321 T2 | 10/1993 |
| DE | 195 26 601 A1 | 1/1997 |
| DE | 196 24 884 A1 | 1/1997 |
| DE | 10 2007 042 207 A1 | 3/2009 |

OTHER PUBLICATIONS

European Patent Office Search Report corresponding to EP 15 15 5555.4, dated Aug. 10, 2015 (German language document) (5 pages).

\* cited by examiner

PRESSURE REDUCING VALVE

This application claims priority under 35 U.S.C. §119 to patent application no. DE 10 2014 205 041.3, filed on Mar. 19, 2014 in Germany, the disclosure of which is incorporated herein by reference in its entirety.

The disclosure relates to a pressure reducing valve, especially a piloted pressure reducing valve.

BACKGROUND

A pressure reducing valve keeps an output pressure (secondary pressure) constant in the case of a variable inlet pressure (primary pressure).

Such a pressure reducing valve is disclosed in printed document DE 35 37 336 A1. This has a switching valve as a main stage and a control valve as a pilot stage. By means of the control valve, the secondary pressure is controlled up to a specified pressure limit. If the secondary pressure exceeds the pressure limit, then a spool of the switching valve is operated in such a way that a control-oil port is connected directly to an output port and the connection is no longer carried out via the control valve. A disadvantage in the case of this solution is that the entire pressure reducing valve is prone to vibrations. During the control process in the pilot stage, two restrictors of the control valve are opened in turn. Especially the opening and closing of that restrictor which controls the opening cross section between the control-oil port and the output port leads to a vibration excitation of a spool of the control valve of the main stage.

Further pressure reducing valves are disclosed in printed document DE 195 26 601 B4 and in printed document DE 37 39 824 C2.

SUMMARY

In contrast to this, the disclosure is based on the object of creating a pressure reducing valve, the tendency of which towards vibrations is comparatively low or is avoided.

This object is achieved by means of a pressure reducing valve according to the detailed description, the drawings, and the claims.

According to the disclosure, provision is made for a pressure reducing valve, especially a 3-way pressure reducing valve, which has a main valve (main stage) and a pilot valve (pilot stage). The main valve has a control part (control spool) which, in dependence upon a pilot pressure which is controlled via a pilot valve, controls an opening cross section between a control-oil port and an output port. For keeping the pilot pressure constant, the pilot valve has a pilot part or two interacting pilot parts. As a result, during a pressure control operation of the pilot valve the adjusted pilot pressure can be kept constant. According to the disclosure, by means of the pilot part, or the pilot parts, a first opening cross section between a further control-oil port or the control-oil port and a pilot port, which is fluidically connected to the main valve, can be controlled. In addition, a second opening cross section can be controlled by means of the pilot part, or the pilot parts, between the pilot port and a drainage port (tank port). Furthermore, both opening cross sections can be opened during the pressure control operation.

This solution has the advantage that by the opening of both opening cross sections during the pressure control operation vibrations are significantly reduced or even avoided since the opening cross sections are not opened and closed in turn.

In the case of the pilot valve outside of the pressure control operation, especially in the de-activated state of the pilot valve, at least one opening cross section is advantageously closed. This advantageously leads to there being no control oil loss outside of the pressure control operation.

In a further embodiment of the disclosure, the pilot pressure can be applied to the control part of the main valve via the pilot port.

The main valve can have a control-oil port, an output port and a tank port. By means of the control part, preferably either the control-oil port is connected to the output port or the output port is connected to the tank port.

The control part is preferably acted upon via a first end face by a force of a spring and the pressure medium of the output port, and via a second end face by the pressure medium of the pilot port of the pilot valve. If the pilot valve is in the "de-activated" state, then the control part can be displaced into an initial position via the force of the spring.

The control-oil ports of the pilot valve and of the main valve can be fluidically connected. Alternatively, it is conceivable to isolate both control-oil ports from each other, as a result of which the pilot valve can be supplied with control oil independently of the main valve.

In a further embodiment of the disclosure, the control part of the main valve, in a center control position in which the forces acting upon the end faces of the control part are neutralized, can isolate the output port from the pressure port and the tank port.

By the force of the spring and the pressure medium of the output port, the control part of the main valve can be acted upon in the direction of first control positions. In these, starting from the center control position, the control part meters an opening cross section between the output port and the tank port via a first restrictor or via a first metering edge. In opposition to the spring force, the control part can be acted upon by the pressure medium of the pilot port of the pilot valve and therefore by the pilot pressure in the direction of second control positions. In these, starting from the center control position, the control part meters an opening cross section between the output port and the pressure port via a second restrictor or second metering edge. Therefore, a secondary pressure can be kept constant in a simple manner by means of the main valve.

The end faces of the control part can have an identical size.

The control part is preferably designed as a control spool. This can be designed with displacement capability in a slide bore and can have a first metering land. This together with control-oil port which opens into the slide bore can then form a first restrictor. Furthermore, the control spool can have a second metering land which together with the tank port which opens into the slide bore forms a second restrictor.

The output port can also open into the slide bore and be formed between the tank port and the pressure port. If the control spool has a recess (annular recess) which is delimited by the metering lands, then via this the pressure port can be fluidically connected to the output port and the output port can be fluidically connected to the tank port.

The metering lands are provided between the end faces of the control spool, for example.

In the pilot valve, the interacting pilot parts can be formed from a first and second pilot part. Therefore, the pilot valve has two pilot parts. The first pilot part can be designed as a pilot spool with a radial land via which the second opening cross section can be controlled. By means of the pilot spool, a seating valve body can be operated as the second pilot part via which the first opening cross section can be controlled. This leads to an exceptionally simple design with regard to equipment engineering in order on the one hand to open both opening cross sections during the pressure control operation and to close one of the opening cross sections outside of the pressure reducing valve.

For adjusting the pilot pressure, the pilot spool can be simply acted upon by a force of an actuator in the direction of the seating valve body. With a displacement of the pilot spool in this direction, the second opening cross section is preferably made smaller and the first opening cross section made larger. In the opposite direction, the pilot spool, especially via the seating valve body, can be acted upon by a primary pressure or by the control oil. If no actuator force is applied to the pilot spool or if the pressure force acting upon the seating valve body (second pilot part) via the control oil is greater than the actuator force, then the first opening cross section can be closed, for example outside to the control operation, if the actuator is "de-activated".

The radial land of the pilot spool can also be designed as a seating valve body. In an initial position of the pilot spool, this seating valve body can make contact with a valve seat and close the second opening cross section. In this case, the second opening cross section is preferably opened.

The pilot spool can have a functional face (end face) pointing away from the second pilot part, via which the pilot spool can be acted upon by the actuator force. Via a further functional face, which points towards the second pilot part, it can act on this in order to displace this.

With regard to equipment engineering, the seating valve body of the second pilot valve can be simply designed as a ball valve body. This, as already explained previously, can be acted upon by the control oil (primary pressure) in opposition to the actuator force. After a determined displacement distance of the pilot spool in a direction away from the seating valve body, the seating valve body makes contact with the valve seat and closes the first opening cross section.

As the actuator, provision is preferably made for a solenoid, especially a proportional solenoid, via which the actuator force can be adjusted.

In the de-energized or "de-activated" state of the actuator, the second opening cross section can preferably be closed, as a result of which the radial land, as a seating valve body, makes contact with its valve seat in this initial position. This can be achieved by the seating valve body being acted upon a force of a spring. If, however, the forces acting upon the second pilot part exceed the spring force, then the first opening cross section is closed by means of the second pilot part and the second opening cross section is open.

After a determined energizing of the actuator, especially in the case of a maximum energizing, the seating valve body of the first pilot part makes contact with its valve seat and closes the second opening cross section, whereas the first opening cross section is opened. Therefore, one of the opening cross sections can be closed in a respective end position of the pilot spool. This furthermore leads to control oil being minimized or completely eliminated as a result of the flow-optimized end positions if it is not required and constitutes a loss capacity.

The pilot spool can be acted upon by a force of a spring of the solenoid in the direction of the second pilot part, as already explained previously. An increasing energization of the solenoid can lead to an increase of the actuator force and in the case of a decreasing energization of the solenoid the actuator force can be reduced.

BRIEF DESCRIPTION OF THE DRAWINGS

In the following text, a preferred embodiment of the disclosure is explained in more detail with reference to drawings. In the drawings.

DETAILED DESCRIPTION

Figure 1:
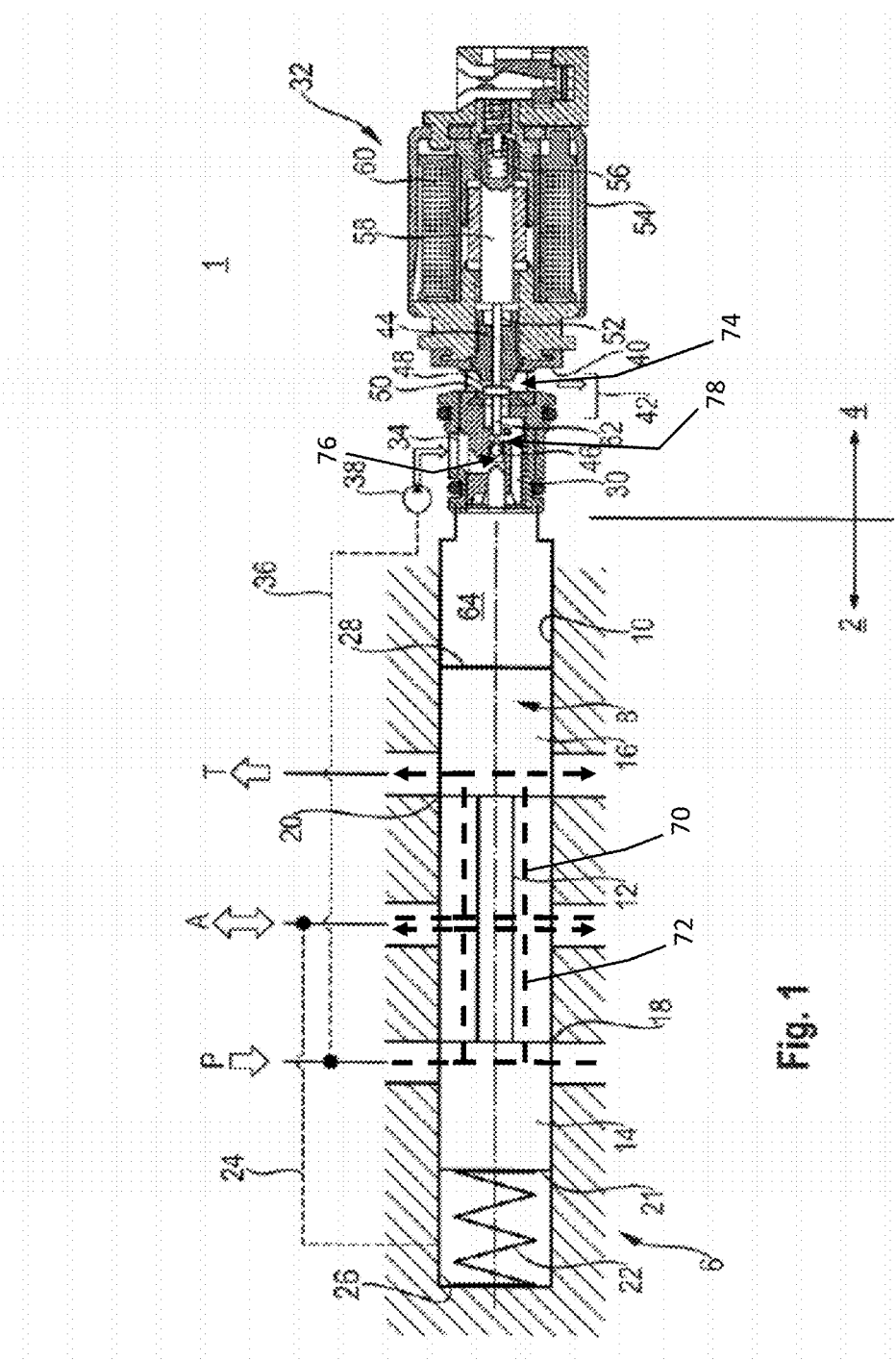
FIG. 1 shows in a schematic longitudinal section a pressure reducing valve according to the disclosure according to an exemplary embodiment and FIG. 2 shows a pressure-current characteristic line of the pressure reducing valve from FIG. 1.

Shown according to FIG. 1 is a pressure reducing valve 1. In this case, it is a piloted 3-way pressure reducing valve. This is used for example in power shift transmissions of private motor vehicles, lorries, buses, construction machines or tractors. It is also suitable for a large number of other hydraulic applications, for example for actuating comparatively large directional valves, power brakes, fan drives, hydraulic pumps or hydraulic motors. The pressure reducing valve has a low susceptibility to vibrations and has low control oil losses. It can be used for high pressures and high volumetric flows of pressure medium.

The pressure reducing valve 1 has a main stage 2 and a pilot stage 4. The main stage 2 has a main valve 6. Via a control part in the form of a control spool 8, a pressure medium connection between the control-oil port P and an output port A and between the output port A and a tank port T can be controlled. In control positions, the output port A is connected in turn in this case either to the control-oil port P or to the tank port T, or all the ports P, A and T are isolated from each other. The ports P, A and T open in each case into a spool bore 10 (slide bore), as seen in series in the axial direction.

The control spool 8 is radially recessed in the middle and as a result of this has an annular groove 12. As a result of this, a first radial land 14 (metering land) and a second radial land 16 (metering land) are formed. Provision is made on the first radial land 14 for a metering edge 18 which together with the control-oil port P which opens into the spool bore 10 forms a first restrictor. The second radial land 16 has a metering edge 20 which together with the tank port T which opens into the spool bore 10 forms a second restrictor. In the center control position shown in FIG. 1, the output port A is isolated both from the control-oil port P and from the output port A. Via a first end face 21, the control spool 8 is acted upon by a force of a spring 22 in the direction of a metered control of an opening cross section 70 between the output port A and the tank port T. In addition, the control spool 8 is acted upon in this direction by a pressure medium of the output port A which is tapped off from the output port A via a control passage 24 and is fed to a spring chamber 26 which is delimited by the end face 21. The end face 28 of the control spool 8 which points away from the end face 21 can be acted upon by the pressure medium of a pilot port 30 of a pilot valve 32 of the pilot stage 4. Therefore, a pilot pressure can act upon the control spool 8 via the end face 28 in opposition to the force of the spring 22 and in opposition to the pressure medium from the output port A. With a displacement of the control spool in this direction, starting from the control position shown in FIG. 1, an opening cross section 72 between the control-oil port P and the output port A is metered.

The pilot valve 32 also has a control-oil port 34. This is connected via a connecting flow path 36 to the control-oil port P. In the connecting flow path 36, provision can additionally be made for a hydraulic pump 38. Furthermore, the pilot valve 32 has a drain port 40 which is connected to a tank 42. The pilot valve 32 has two interacting parts 44 and 46. The pilot part 44 is a pilot spool 44 with a radial land 48. This serves as a seating valve body 48, especially as a poppet-type seating valve. A valve seat 50 is associated with this. If the radial land 48 is in contact with the valve seat 50, then an opening cross section 74 at the pilot port 30 is blocked towards the drain port 40. The pilot spool 44 has a section 52 which extends away from the radial land 48 and from the pilot part 46. Via this section, the pilot spool 44 can be acted upon by a force of an actuator in the form of a proportional solenoid 54. This has a spring 56 via which the pilot spool 44 and therefore the radial land 48 is acted upon by a spring force in the direction of the valve seat 50. For this purpose, the spring 56 acts upon an armature 58 of the proportional solenoid 54 which in turn butts against an end face of the pilot spool 44. The armature 58 is encompassed by a coil arrangement 60. If this is energized, then the armature 58 is acted upon by a magnetic force in the direction of the force of the spring 56. With increasing energization of the coil arrangement 60, the actuator force acting upon the pilot spool 44 therefore increases.

Extending from the radial land 48 in the opposite direction to the spool section 52 is a further spool section 62. This can butt by its end face against the second pilot part 46 which is designed in the form of a ball valve body. A valve seat 78 is also associated with the ball valve body 46. If the ball valve body 46 is in contact with the valve seat 78, then a pressure medium connection via an opening cross section 76 between the control-oil port 34 and the pilot port 30 is closed. If the pilot spool 44 butts against the ball valve body 46 and is moved in a direction away from the proportional solenoid 54, then the ball valve body 46 is removed from its valve seat 78.

According to FIG. 1, the pilot parts 44, 46 are shown during the pressure control operation. In this, both the radial land 48 and the ball valve body 46 are lifted from their respective valve seats 50 and 78. Therefore, both the pressure medium connection between the control-oil port 34 and the pilot port 30 via the opening cross section 76 and the pressure medium connection between the pilot port 30 and the drain port 40 via the opening cross section 74 are open, as a result of which vibration excitations of the pilot valve 32 and of the main valve 6 are reduced or avoided. By means of the pilot valve 32, a pilot pressure which is applied to the end face 28 of the control spool 8 can be kept constant. The pilot pressure is adjusted in this case by the energizing of the proportional solenoid 54.

In the de-energized state of the proportional solenoid 54, the pilot part 44 is displaced by the force of the spring 56 away from the proportional solenoid 54 if the forces acting upon the pilot part 46 in opposition to the spring force are greater. In this case, the radial land 48 makes contact with the valve seat 50 to close the opening cross section 74. If the forces acting upon the pilot part 46 in the de-energized state of the proportional solenoid 54 in opposition to the spring force exceed the spring force, then the pilot valve 46 is displaced onto its valve seat 78 and closes the corresponding opening cross section 76. Therefore, no control oil can flow from the control-oil port 34 to the drain port 40 outside of the pressure control operation since one of the opening cross sections is closed. This further leads to the control oil losses of the pilot valve 32, and therefore of the entire pressure reducing valve 1, being exceptionally low.

The pilot port 30 of the pilot valve 32 is connected according to FIG. 1 to a pressure chamber 64 of the spool bore 10 which is delimited by the end face 28 of the control spool 8.

According to FIG. 1, the main valve 6 is arranged coaxially to the pilot valve 32.

Figure 2:
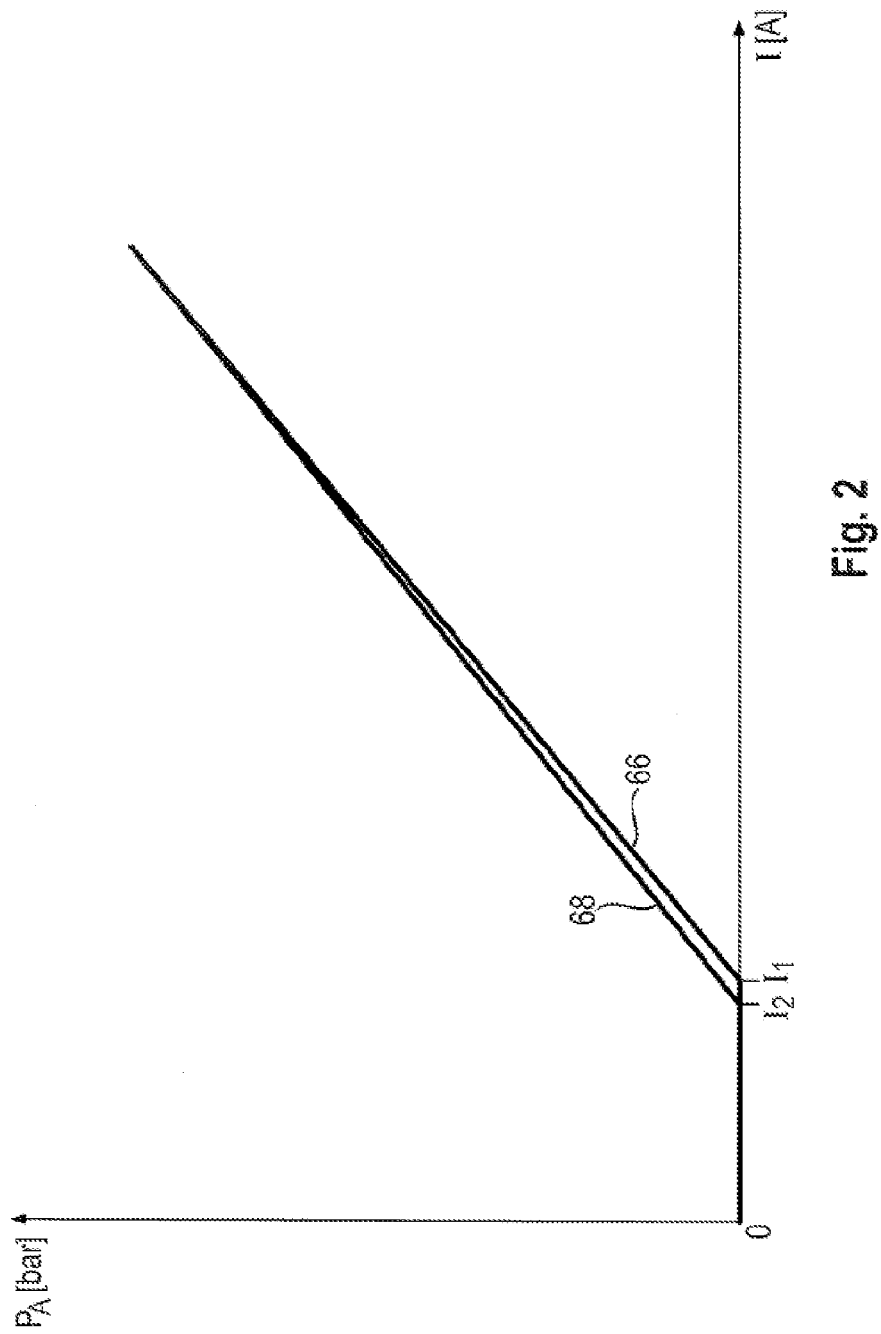

According to FIG. 2, a current-output pressure characteristic line of the pressure reducing valve 1 is shown. If the proportional solenoid 54 from FIG. 1 is engaged and energized, then the output pressure $p_A$ in the output port A of the main valve 6 increases only from a current $I_1$ onwards—see characteristic line 66 in FIG. 2. This results from the force of the spring 22 having to be overcome so that the control spool 8 can be displaced into its control positions by means of the pilot pressure. The adjusted output pressure $p_A$ is approximately proportional to the current I of the proportional solenoid 54 from the current $I_1$ onwards. If the energizing of the proportional solenoid is decreased, then the output pressure $p_A$ is proportional to the current I corresponding to a characteristic line 68—see FIG. 2—which results on account of a hysteresis. From a current $I_2$ onwards, with a decrease of said current, the output pressure $p_A$ is zero, wherein $I_2$ is less than $I_1$.

Disclosed is a pressure reducing valve with a main valve and a pilot valve. This, in dependence upon a pilot pressure which is regulated via the pilot valve, adjusts an opening cross section between a control-oil port and an output port and between the output port and a tank port. The pilot valve keeps the adjusted pilot pressure constant during the pressure control operation. The pilot valve has at least one pilot part, by means of which a first opening cross section between a control-oil port and a pilot port which is fluidically connected to the main valve can be controlled. Furthermore, by means of the at least one pilot part a second opening cross section between the pilot port and a drain port can be controlled. During a pressure control operation for regulating the pilot pressure, both opening cross sections are opened.

LIST OF DESIGNATIONS

1 Pressure reducing valve
2 Main stage
4 Pilot stage
6 Main valve
8 Control spool
P Control-oil port
A Output port
T Tank port
10 Spool bore
12 Annular groove
14 Radial land
16 Radial land
18 Metering edge
20 Metering edge
21 End face
22 Spring
24 Control passage
26 Spring chamber
28 End face
30 Pilot port
32 Pilot valve
34 Control-oil port
36 Connecting flow path
38 Hydraulic pump
40 Drain port
42 Tank 44 Pilot part
46 Pilot part
48 Radial land
50 Valve seat
52 Spool section
54 Proportional solenoid
56 Spring
58 Armature
60 Coil arrangement
62 Spool section
64 Pressure chamber
66 Characteristic line
68 Characteristic line

What is claimed is:

1. A pressure reducing valve, comprising:
a pilot valve that is configured to regulate a pilot pressure, and that includes:
  a pilot port;
  a drain port;
  a first control-oil port;
  a first opening cross section arranged between the first control-oil port and the pilot port;
  a second opening cross section arranged between the pilot port and the drain port; and
  at least one pilot part configured to:
    regulate the pilot pressure toward a constant pressure during a pressure control operation; and
    control the first and second opening cross sections, such that pressure simultaneously communicates across the first and second opening cross sections during the pressure control operation; and
a main valve that is fluidically connected to the pilot port and that includes:
  a second control-oil port;
  an outlet port;
  a third opening cross section arranged between the second control-oil port and the outlet port; and
  a control part configured to control the third opening cross section with reference to the pilot pressure.

2. The pressure reducing valve according to claim 1, wherein, outside of the pressure control operation, at least one of the first and second opening cross sections is closed.

3. The pressure reducing valve according to claim 1, wherein the pilot port is configured to apply pressure medium to the control part.

4. The pressure reducing valve according to claim 1, wherein:
the main valve further includes a tank port; and
the control part is further configured to (i) selectively connect the second control-oil port to the output port, or (ii) selectively connect the output port to the tank port.

5. The pressure reducing valve according to claim 1, wherein:
the control part includes a first end face and a second end face;
the main valve further includes a spring configured to act on the first end face of the control part;
the output port is configured to apply pressure medium that acts on the first end face of the control part; and
the pilot port is configured to apply pressure medium that acts on the second end face of the control part.

6. The pressure reducing valve according to claim 5, wherein:
the main valve further includes:
  a tank port; and
  a fourth opening cross section arranged between output port and the tank port;
the control part, in a center control position, is configured to isolate the output port from the second control-oil port and from the tank port;
the control part further includes a first metering edge and a second metering edge;
the spring and the pressure medium from the output port act on the control part in a direction of first control positions which, starting from the center control position, are configured to meter the fourth opening cross section via the first metering edge; and
the pressure medium from the pilot port acts in opposition to the spring and in a direction of second control positions which, starting from the center control position, are configured to meter the third opening cross section via the second metering edge.

7. The pressure reducing valve according to claim 4, wherein:
the control part further includes:
  a control spool that is displaceably arranged in a slide bore defined by the main valve, the second control-oil port opening into the slide bore;
  a first metering land which, together with the second control-oil port, defines a first restrictor; and
  a second metering land which, together with the tank port, defines a second restrictor.

8. The pressure reducing valve according to claim 1, wherein:
the at least one pilot part includes two separate pilot parts;
a first of the two separate pilot parts is a pilot spool that has a radial land configured to control the second opening cross section; and
the pilot valve further includes a seating valve body that, via the pilot spool, defines and is operable as a second of the two separate pilot parts, and that is configured to control the first opening cross section.

9. The pressure reducing valve according to claim 8, wherein:
the pilot valve further includes an actuator configured to act on the pilot spool in a direction of the seating valve body in order to adjust the pilot pressure; and
the pilot spool is configured and arranged such that a displacement of the pilot spool in the direction of the seating valve body results in the second opening cross section being made smaller, and the first opening cross section being made larger.

10. The pressure reducing valve according to claim 8, wherein:
the pilot valve further includes a first valve seat; and
the radial land of the pilot spool defines the seating valve body which, in an initial position of the pilot spool, is in contact with the first valve seat and closes the second opening cross section.

11. The pressure reducing valve according to claim 9, wherein:
the pilot spool further includes a functional face that points away from the second of the two pilot parts; and
the actuator is configured and arranged to act on the functional face of the pilot spool in order to displace the pilot spool.

12. The pressure reducing valve according to claim 9, wherein:
the pilot valve further includes a second valve seat; and
the seating valve body includes a ball valve body that is configured and arranged to:

be acted on by control oil in opposition to the actuator; and after a determined displacement distance of the pilot spool in direction away from the ball valve body, make contact with the second valve seat and close the first opening cross section.

13. The pressure reducing valve according to claim 9, wherein the pilot valve further comprises a further spring configured to act on the first of the two pilot parts in a direction the direction of the seating valve body.

14. The pressure reducing valve according to claim 12, wherein:

the pilot valve further comprises a further spring configured to act on the first of the two pilot parts in a direction the direction of the seating valve body;

in a de-energized state of the actuator, the further spring is configured to act on the first of the two pilot parts such that the first of the two pilot parts is in contact with a first valve seat via the radial land and closes the second opening cross section; and in a state where forces acting on the ball valve body in opposition to a force of the further spring are greater than the force of the further spring, the ball valve body is configured and arranged to make contact with the second valve seat and close the first opening cross section.

\* \* \* \* \*